Oct. 4, 1960 E. R. McCORD ET AL 2,954,569
TRAILER BOAT
Filed Feb. 3, 1958 2 Sheets-Sheet 2
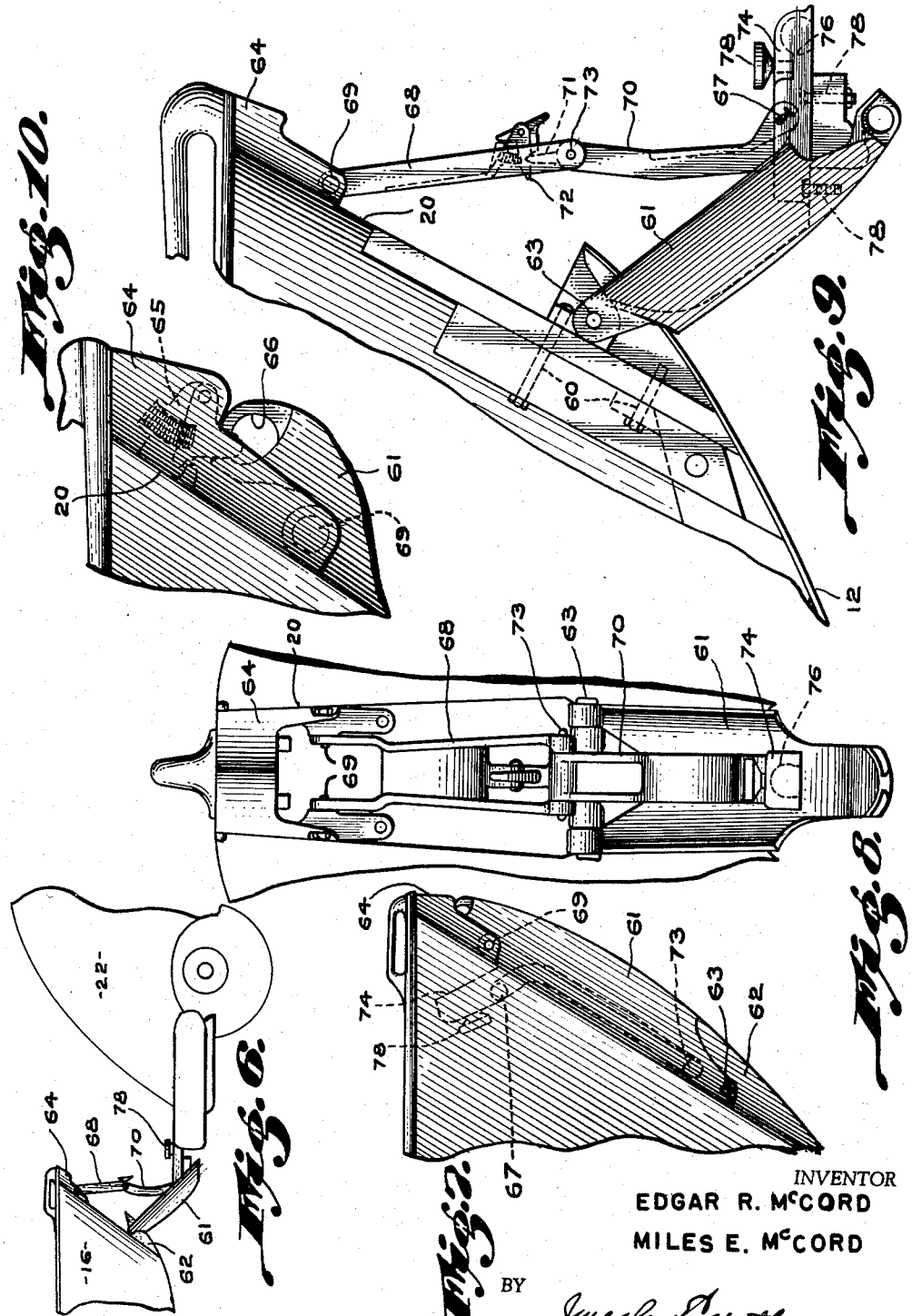
INVENTOR
EDGAR R. McCORD
MILES E. McCORD
BY
*J. Wesley Everett*
ATTORNEY

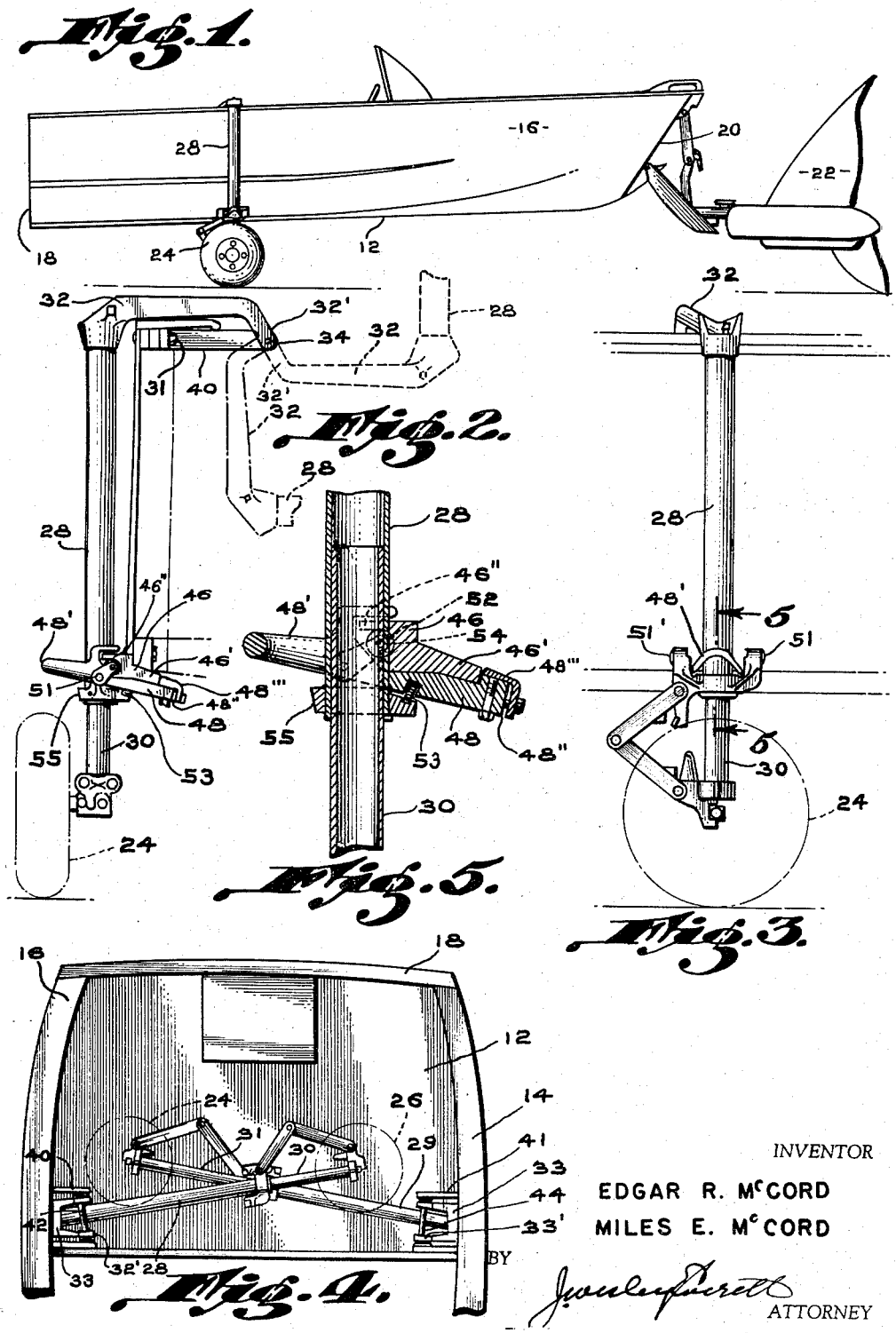

2,954,569
TRAILER BOAT

Edgar R. McCord and Miles E. McCord, both of Joppa Road, Satyr Hill, Baltimore 14, Md.

Filed Feb. 3, 1958, Ser. No. 712,906

1 Claim. (Cl. 9—1)

The present invention relates to a trailer type boat and in particular where the wheels supporting the boat are always attached to the boat hull.

The primary object of the invention is to provide a pair of wheels for supporting the boat for transporting the boat when out of water.

Another object of the invention is to provide that the wheels and their supporting elements be moved completely within the boat hull with a minimum of effort.

A further object of the invention is to provide means positioning the wheels adjacent the stern of the boat when placed within the hull.

Still a further object of the invention is to provide the forwardmost part of the bow with means for hitching the boat to a vehicle.

While several objects of the invention have been set forth other objects, uses and advantages will become apparent as the nature of the invention is more fully disclosed, which consists in its novel construction, arrangement and combination of its several parts illustrated in the accompaying drawings and described in the detail description to follow. In the drawings:

Figure 1 is a view in elevation of the boat as it appears hitched to a vehicle.

Figure 2 is an enlarged front view of the wheel support illustrating the manner in which the wheel support is secured to the hull.

Figure 3 is an enlarged side view of the wheel support.

Figure 4 is a fragmentary plan view of the hull, illustrating how the wheel and wheel supports are positioned into the stern portion of the boat when they are not in use in towing the boat overland.

Figure 5 is a fragmentary sectional view taken along line 5—5 of Figure 3.

Figure 6 is a fragmentary illustration in side elevation, showing diagrammatically the boat connected with a vehicle.

Figure 7 is an enlarged side view of the boat bow in elevation.

Figure 8 is an enlarged front view of the boat bow and trailer hitch.

Figure 9 is an enlarged view in side elevation showing the hitch in position to be connected to the vehicle.

The boat is provided with a bottom 12, sides 14 and 16, a stern 18 and a bow 20 and is referred to sometimes as the hull. The boat is adapted to be towed behind a wheel vehicle 22 by a special hitch, which forms a part of the bow of the boat.

Located toward the stern half of the hull are a pair of wheels 24 and 26 for supporting the hull when it is being towed over-land. The wheels are provided with supporting means hingedly fixed to the hull in such a manner that the wheels and supports may be folded into the rear section of the hull when the boat is being used in the water. A wheel and wheel support are attached to each side of the boat and are of substantially the same design and structure therefore, in some instances only the details of one are described in detail. Each wheel is hydraulically supported in the member 28 and 29 respectively. The wheels are fixed by any suitable means to members 30 and 31 respectively, which are hydraulically cushioned within the members 28 and 29. Fixed to the top of the members 28 and 29 are brackets 32 and 33 which extend inwardly over the boat hull. The innermost ends 32' and 33' of the brackets 32 and 33 extend downwardly to a point below the upper edge of the hull. Secured to each side the hull are brackets 40 and 41. These brackets extend to a point to meet the outer turned-down ends of the brackets 32 and 33 where they are hinged by pins 42 and 44. This construction allows the wheels and wheel supports to be swung over the sides of the hull and folded in the stern half of the boat, as shown best in Figure 4.

In order to keep the wheel supports 28 and 29 in position to support the boat, there is provided a latching means carried by the members 28 and 29 adjacent their ends. This latching means is shown in detail in Figs. 2, 3 and 5. There is provided a plate 46 secured to the boat adjacent the junction of the lower edge of the sides and the bottom so designed as to receive the engaging elements of the latch. The plate is preferably provided with two major portions, that is, a portion 46' and a portion 46". The latch consists of hinged elements, as shown at 48 in Figs. 2, 3, and 5. The latch elements are carried and hinged to a collar 51 by suitable pins 55. The collar is fixed on the lower end of the member 28 and 29 such as are shown at 51 and 51'. The latch is spring loaded by spring 53 in such a manner as to press the end 48" of the latch upwardly. The outer end 48' of the latch provides a handle which, when lifted moves the inner end 48" downwardly out of locking engagement with the end 46' of the plate 46. The inner end 48" of the member 48 is provided with an adjustable bracket 48', which is movable relative to the inner end 48" of the latch 48 which is adapted to engage the inner end 46' of the plate 46. The latch is also provided with a resilient member 52 for engaging a recess 54 in the plate 46 located below the portion 46". This resilient member 52 is preferably constructed of rubber or some suitable elastic material, and is positioned to take the vertical thrust of the load of the hull on the wheel supports. The latching bracket 48' engages the inner end 46' of the plate 46 to keep the wheels and wheel supports in their normal operation position when the wheels are in position for overland travel.

In overland travel, the wheels are in the position as shown in Figs. 1, 2, 3, and 5. The wheel supports are hingedly connected to the inner ends of the brackets 40 and 41 by the pins 34. The latch 48 automatically engages the plate 46 when it is forced against the plate 46.

When the boat is in the water the wheels are removed from without the hull together with the wheel supports preferably to the rear half of the hull, by forming the brackets with short and long sides, as shown in Fig. 4, the wheel supports will not remain in the same vertical plane when folded into the hull as they are when they are supporting the boat, that is, the hinge may be made to move the wheel and wheel supports rearwardly out of the way of the space normally occupied by the occupants, and to a space in this type boat which may be provided with a cover, or hatch.

Referring again to the bow 20 of the boat, the hitch forms a part of the bow and is shaped to substantially carry out the contour of the hull. The hitch is preferably constructed of a casting which is fastened to the bow by suitable bolts 60. The hitch is provided with a cover member 61, which extends over the major portion of the bow and is hingedly connected to a lower portion 62 of the casting by the pin 63. The cover member 61 is adapted to extend upwardly over the bow of the boat to engage a second portion of the casting 64 and is held in closed position by a spring loaded latch 65, by releasing the latch 65 through the opening 66 the member 61 may be swing downwardly about the pivot pin 63 to a position as shown in Fig. 9. For limiting the downwardly movement of the outer end of the cover member 61, there is provided a pair of link members 68 and 70 which fold into the bow when in folded position. The link member 68 has one end pivotally connected to the bow portion 64 by pins 69 and its opposite end connected with one end of the link member 70 by the pin 73. The opposite end of the link member 70 is connected with the upper end of cover member 61 by the pin 67. The link 70 is provided with an extension 71 which is engageable by a second spring loaded latch arm 72. Secured to the upper end of the cover member 61 is a conventional type bracket 74 including a socket 76. The bracket 74 is fixed to the cover member 61 by bolts 78, or in any other convenient manner.

When the boat is being used in the water the cover member 61 is folded to the position as shown in Fig. 7, but when the boat is to be attached to a vehicle, the cover is unfolded and is in the position as shown in Fig. 9, the socket 76 is placed over a spherical arbor carried on the vehicle and the member 74 is secured to the arbor by operating a conventional fastening means therefor in the form of the member 78 which is of standard and well known construction.

There are numerous advantages in the present boat, the wheels for overland travel are so arranged that they are foldable into the stern portion of the hull and are completely out of sight when the boat is viewed from the side, in fact, they can only be observed when you are substantially over the boat looking downwardly into the hull. The wheels and their supports also lie substantially along the bottom of the hull and substantially parallel with the bottom. When the wheels and their supports are folded into the hull the customary cover for boat hulls of this type may be placed over the compartment without any detection of the wheels or their supports.

When it is desired to remove the boat from the water the wheel supports are raised from the interior of the boat hull and swung outwardly over the sides of the boat. When the latch 48 is pressed in contact with the plate 46 it will engage the plate and hold the wheel supports adjacent the side of the boat and in position for supporting the hull for overland towing.

The hitch is also unique in its construction and operation. When the boat is in the water it operates as the forward part of the bow, and when unfolded it acts as a hitch to be coupled to the vehicle. The boat is completely transformed for overland travel without any additional equipment, such as a separate trailer, removable wheels and/or separate hitching means or the like.

While a specific form of the invention has been illustrated and described in the patent it is not intended as a limitation as the scope of the invention is best defined with appended claim.

I claim:

A trailer boat comprising in combination, a boat hull including a bottom, two side portions, a stern portion and a bow portion, a wheel and a foldable wheel support positioned at a point along each side of the hull forward of the stern, the wheel supports having a vertical portion when in operating position extending downwardly from the upper edge and along the outer surface of the side members of the boat hull in a plane substantially perpendicular to a horizontal plane passing through the axis of the hull, the wheels being rotatably secured to the lower ends of the wheel supports rotatably in a plane parallel with the longitudinal axis of the hull and below the horizontal plane of the bottom of the hull to support the hull when the wheels are in contact with a substantially solid surface, a bracket having one end fixedly secured to the inner surface of each of the said side portions and adjacent the top thereof and their other ends extended inwardly toward the center of the boat for supporting the upper ends of the wheel supports, the upper ends of each wheel support having a single lateral portion extended inwardly and downwardly from the upper end of the vertical portion adapted to extend over the upper edge of each of the side portions of the hull having their extended ends hinged to the inner end of the respective bracket carried by the side portions and means in the form of a fixed pin positioned below the plane of the upper edges of the side portions for hingedly connecting the inner end of each bracket with the respective inner end of each of the upper lateral portions of the wheel supports, the prolongation of the axis of each hinge on the inner end of the two brackets and on each of the respective lateral portion of each wheel support extending in the direction of the bow forming an acute angle with the longitudinal axis of the hull in order to position the wheels nearer the stern of the hull when the wheel supports are folded within the boat hull.

References Cited in the file of this patent

UNITED STATES PATENTS

| | | |
|---|---|---|
| 2,038,975 | Willetts | Apr. 28, 1936 |
| 2,219,254 | Davis | Oct. 22, 1940 |
| 2,403,835 | Villepigue | July 9, 1946 |
| 2,421,671 | West | June 3, 1947 |
| 2,424,641 | Swanson | July 29, 1947 |
| 2,500,602 | Christensen | Mar. 14, 1950 |
| 2,578,376 | Smith | Dec. 11, 1951 |
| 2,622,893 | Wasserlein | Dec. 23, 1952 |
| 2,632,655 | King et al. | Mar. 24, 1953 |
| 2,733,936 | Tate | Feb. 7, 1956 |
| 2,852,266 | Wagner | Sept. 16, 1958 |

OTHER REFERENCES

"Boats," vol. 53, No. 9, Sept., 1956, page 34.